United States Patent [19]
Kinne

[11] 3,884,645
[45] May 20, 1975

[54] PRODUCTION OF ANHYDROUS SODIUM METASILICATE IN A FLUIDIZED BED

[75] Inventor: Walter E. Kinne, Fort Montgomery, N.Y.

[73] Assignee: Stauffer Chemical Company, New York, N.Y.

[22] Filed: Sept. 12, 1972

[21] Appl. No.: 288,471

Related U.S. Application Data

[63] Continuation of Ser. No. 28,028, April 13, 1970, abandoned, and a continuation-in-part of Ser. No. 1,089, Jan. 7, 1970, abandoned.

[52] U.S. Cl................. 23/313; 23/313 FB; 106/74; 117/100 S; 423/333; 423/334
[51] Int. Cl. ......................... C01b 33/32; B01j 2/16
[58] Field of Search.......... 23/302, 313 AS, 313 FB, 23/300; 106/74; 117/100, 100 S; 159/DIG. 3; 423/332, 333, 334; 264/117

[56] References Cited
UNITED STATES PATENTS

| | | | |
|---|---|---|---|
| 2,970,038 | 1/1961 | Hyde.................................... | 23/302 |
| 3,021,195 | 2/1962 | Podchus et al. .................... | 423/332 |
| 3,152,005 | 10/1964 | Tuttle ................................. | 117/100 |
| 3,208,822 | 9/1965 | Baker et al. .......................... | 23/302 |
| 3,339,618 | 9/1967 | Bowden et al........................ | 159/38 |
| 3,340,018 | 9/1967 | Othrhalek........................... | 423/332 |
| 3,377,134 | 4/1968 | Baker et al. ........................ | 423/332 |
| 3,529,979 | 9/1970 | Yarsa.................................. | 423/332 |

*Primary Examiner*—Norman Yudkoff
*Assistant Examiner*—S. J. Emery

[57] ABSTRACT

This invention provides a process for producing uniform, spherical anhydrous sodium metasilicate particles. The process comprises providing a plurality of anhydrous sodium metasilicate particles in a fluidization zone, contacting the particles in the zone with a flowing stream of heated air to maintain the particles in a dense fluidized bed, and contacting the particles in the fluidized bed with an aqueous sodium metasilicate liquor to produce crystallized anhydrous sodium metasilicate.

11 Claims, 1 Drawing Figure

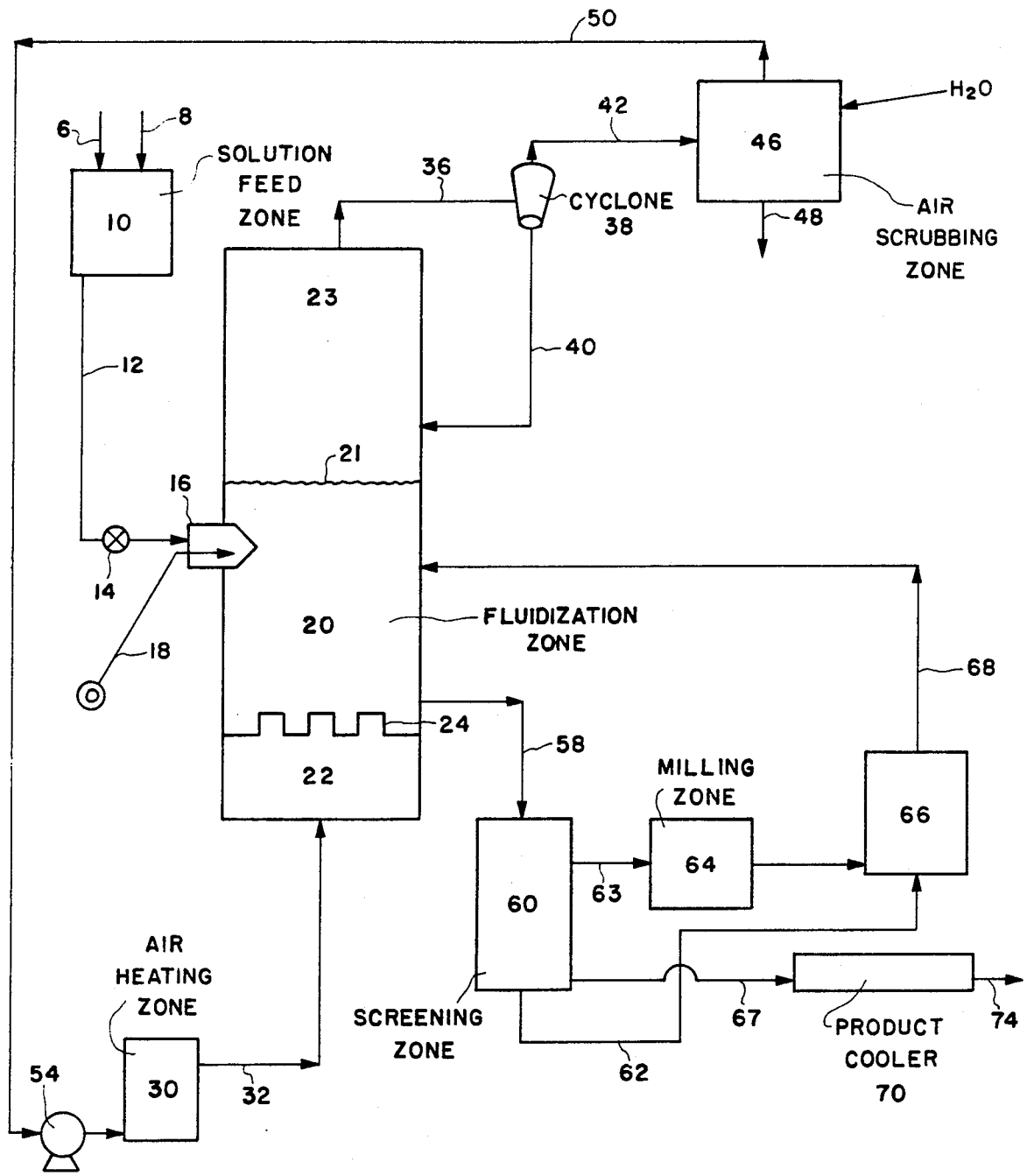

PRODUCTION OF ANHYDROUS SODIUM METASILICATE IN A FLUIDIZED BED

RELATED APPLICATIONS

This is a continuation of application Ser. No. 28,028, filed Apr. 13, 1970, now abandoned; and a continuation-in-part of U.S. Pat. application, Ser. No. 1,089, filed Jan. 7, 1970, now abandoned.

This invention relates to the production of anhydrous sodium metasilicate and more particularly it relates to the production in a dense fluidized bed of anhydrous sodium metasilicate having improved physical properties.

By anhydrous, it is meant that the product or material referred to, contains up to about 3% water.

Anhydrous sodium metasilicate which is commercially available today is manufactured by maintaining a plurality of seed particles in an agitated state by tumbling in a rotating cylinder. The particles are coated by spraying silicate liquor on the tumbling particles in order to build up layers of crystallized anhydrous sodium metasilicate. Heat is preferably applied by contacting the tumbling particles with steam to dehydrate the sodium metasilicate thereby forming a solid film or coating on the surface of the particles. This method is described in U.S. Pat. No. 3,208,822 patented Sept. 28, 1965. In accordance with another prior art method, anhydrous sodium metasilicate is manufactured by melting together the necessary raw materials including soda ash and refined sand at high temperatures. The product is cooled and allowed to crystalline into a mass which usually includes all of the original impurities of the reactants along with some refractory materials from the furnace walls. The mass of crystallized product must then be crushed or ground to the desired particle size range with the result that the ground product contains a considerable amount of dust.

The metasilicate particles produced by the prior art process do not possess the desired properties, namely uniform, spherical anhydrous sodium metasilicate particles. Instead, the prior art particles are jagged edged, unsmooth, soft and easily worn away in any process in which they may be used.

The principal object of the present invention is therefore to provide an economical fluidized bed process for the production of uniform, spherical anhydrous sodium metasilicate particles having a high attrition resistance.

Another object of the present invention is to provide more uniform and spherical anhydrous sodium metasilicate particles having a minimum dust content.

These and other objects of the present invention are generally accomplished in the following manner. Particles of anhydrous sodium metasilicate are maintained as a dense fluidized bed by contact with an upwardly flowing stream of heated air. Aqueous sodium metasilicate liquor in finely dispersed form is contacted with the particulate material and dehydrated to produce a product comprising anhydrous sodium metasilicate. It has been discovered in the practice of the present invention that the product produced in the fluid bed has surprisingly improved physical properties including greater resistance to attrition when compared with prior products.

Reference is now made to the drawing which illustrates diagrammatically in elevation, one embodiment of the process of the present invention.

A suitable solution of sodium metasilicate is prepared by dissolving sodium metasilicate introduced in line 6 in water introduced in line 8 to solution feed zone 10. Sodium hydroxide can also be added if necessary to adjust the silicate $Na_2O:SiO_2$ mole ratio. Preferably, the silicate $Na_2O:SiO_2$ mole ratio is maintained between about 0.95 and about 1.1, although for most uses the mole ratio of about 1.04 to 1.06 is preferred. Preferably, the aqueous solution contains between about 40 and about 60% sodium metasilicate in water. This solution is passed via line 12 at a rate control by a valve 14 to a suitable distributor means 16 for introduction into a fluid bed 20. While any suitable distribution means can be employed, the distribution which is preferred is a 2-fluid nozzle which employs dispersion air introduced via line 18.

The aqueous sodium metasilicate liquor which is introduced into the fluid bed can also be prepared by digesting sand with caustic, as described, in U.S. Pat. No. 3,471,253. As described in the patent, sand is digested with NaOH, at an elevated temperature between about 190° and about 240°C. and under a pressure between about 140 and about 325 psi. In this preparation, it is preferred to maintain the temperature between about 200° and about 225°C. and the pressure between about 200 and about 250 psi.

It is noted that by preparing the sodium metasilicate liquor by this method, i.e., digesting sand with NaOH, that the resulting aqueous sodium metasilicate liquor has a very low carbonate content due to the absence of appreciable amounts of $Na_2CO_3$ in the NaOH, whereas in the case of melting sand with soda ash, (i.e., $Na_2CO_3$), a residue of carbonate remains in the material.

The fluidization zone 20 contains particles of anhydrous sodium metasilicate which are maintained in a dense fluidized condition by the action of air flowing upwardly through the zone. The temperature of the particles in the dense fluidization zone is preferably maintained at a temperature between about 125° and about 350°C. and most preferably between about 175° and about 225°C. The superficial velocity of flowing gases in the fluidization zone is preferably maintained at between about 75 and about 200 feet per minute, or at a superficial velocity sufficient to produce fluidization without transporting the material out of the fluid bed 20. Heated fluidizing air is provided by means of air heating zone 30 which raises the temperature of the air preferably to between about 250° and about 1,000°C., and most preferably to between about 300° and 600°C. prior to its introduction to the fluidization zone 20 via line 32, windbox 22 and air distribution means 24.

The numeral 21 denotes the meniscus which separates dilute phase 23 from dense fluidization zone 20. Fluidization air and entrained particulate material are withdrawn overhead in line 36 through cyclone 38 wherein fine particulate material is separated and returned to the dilute phase via line 40. Gaseous material is passed via line 42 to a suitable air scrubbing zone 46.

In a preferred embodiment of the present invention, the fluidization air is scrubbed with a suitable agent which removes substantially air of the silicate fines from the air. Water is the preferred scrubbing agent from an economic viewpoint, although any suitable alkaline material such as a sodium metasilicate solution can be employed. The scrubbing agent is discharged from zone 46 in line 48. It has been found in the practice of the present invention that recycling air via line 50 through compressor 54 is highly advantageous from the standpoint of maintaining extremely low carbon dioxide concentrations in the system. In this manner, it has been found that carbon dioxide concentrations in the circulating air can be maintained at less than 50 ppm (vol.). This $CO_2$ concentration has been found satisfactory in order to produce anhydrous sodium metasilicate having acceptable solution properties such as turbidity.

Distributor nozzle or nozzles 16 can be disposed in any suitable manner for spraying feed liquid into the dense fluidization zone 20. In small scale operations, it is desirable to spray upwardly into the dense bed to avoid building up a crust of material on the sides of the fluidization zone 20. However, in beds having a diameter larger than about 5 or 6 feet a nozzle or plurality of peripherally disposed nozzles can be situated such that they spray generally horizontally into the fluidized bed.

Particulate product material is discharged via line 58 to screening zone 60 for fractionation into cuts of desired size range. The particulate material withdrawn from the fluidization zone contains particles having sizes ranging from −10 through +100 (U.S. Standard Screen Mesh Sizes). The product cut withdrawn in line 67 preferably has about the following size distribution.

| U.S. Std. Screen Numbers | Percent Distribution |
| --- | --- |
| +40 | 14 |
| +60 | 23 |
| +80 | 13 |
| +170 | 47 |
| −170 | 3 |

In the preferred embodiment of this invention, it is desired to keep the $CO_2$ content in the feed solutions at a low level, i.e., below 1.0% by weight on a dry basis, and preferably between 0.3 and 0.8%.

Reference is now made to specific examples of operations which illustrate carrying out the process of the present invention on a pilot plant scale. The Examples (1 through 9) which are illustrated in Table 1 below, were carried out in apparatus similar to that illustrated in the drawing and described hereinabove.

In Example 1, the heat source for heating the fluidized bed was a direct fired air heater, whereas in the other examples, i.e., 2 through 9, the fluidized bed was heated with an electric air heater.

The percentage of the solids and $CO_2$ in the feed and product are by weight and on a dry basis.

TABLE I

| | Examples | | | | | | | | |
| --- | --- | --- | --- | --- | --- | --- | --- | --- | --- |
| Temperatures (°C) | 1 | 2 | 3 | 4 | 5 | 6 | 7 | 8 | 9 |
| Feed | 100 | 100 | 100 | 100 | 100 | 50 | 50 | 50 | 50 |
| Inlet Air | 400 | 340 | 340 | 347 | 330 | 330 | 340 | 350 | 330 |
| Fluid Bed | 200 | 200 | 200 | 178 | 180 | 180 | 180 | 200 | 170 |
| Weight of Fluidized Bed (lbs) | 68 | 85 | 80 | 80 | 85 | 85 | 85 | 112 | 85 |
| Fluidized Air Rate (ft³/min.) | 80 | 110 | 120 | 120 | 120 | 120 | 112 | 120 | 120 |
| Feed Rate (lb/hr) | 23.0 | 23.0 | 39.0 | 27.0 | 24.0* | 19.4 | 18.7 | 18.8 | 18.3 |
| Feed Na₂O/SiO₂ ratio | 1.0 | 1.0 | 1.02 | 1.10 | 1.04 | 1.04 | 1.04 | 1.04 | 1.04 |
| Feed (%) Solids | 45 | 45 | 45 | 45 | 45 | 35.0 | 35.0 | 52.0 | 37.8 |
| Feed (%) CO₂ (Dry basis) | 0.90 | 0.90 | 0.90 | 0.90 | 0.90 | 0.35 | 0.35 | 0.35 | 0.35 |
| Product (%) H₂O | 1.25 | 1.88 | 1.90 | 2.08 | 2.31* | 2.25 | 2.20* | 2.35 | 2.44 |
| Product (%) CO₂ | 9.4 | 2.0 | 1.9 | 1.8 | 1.1 | 0.51 | 0.57 | 0.47 | 0.52 |
| Product Solution (10%) Turbidity % (Light Transmission) | Low | Low | Low | 66.0 | 67.0 | 85.0 | 86.0 | 86.0 | 85.0 |
| Product Density (lbs/ft³) | 61 | 71 | 71.2 | 72.1 | 70.6* | 76.8* | 77.3* | 77.4* | 77.5 |
| Recycle Rate - Fines (lb/hr) | 6 | 4.9 | 11.7 | 14.2 | 13.4* | 3.1 | 5.8 | 4.6 | 5.0 |
| Recycle Rate - Oversized (lb/hr) | 5 | 3.0 | 1.5 | 0.5 | 0.4* | 0.4 | 0.5 | 0.6 | 5.0 |

*Approximate

| U.S. STD. Screen Numbers | Percent Distribution |
| --- | --- |
| +20 | 0 |
| +30 | 32 |
| +40 | 65 |
| +60 | 3 |
| +80 | 0 |
| −80 | 0 |

The material is cooled in product cooler 70 and passed through suitable bagging or packaging operations via line 74. The fines are separated in line 62. The fines have a size range of about −40 mesh to +100 mesh. The oversized material is withdrawn in line 63 and reduced in size in milling zone 64 to material having a preferable size range of about −40 to +80 mesh. The material in line 63 and 62 is combined in 66 for reintroduction to the dense fluidization zone 20 via line 68. The material in line 68 has about the following size distribution.

As shown in Table I, the product solutions of Examples 1 thru 5, have a high turbidity, i.e., a low percent of light transmission, which is due directly to the large amount of $CO_2$ and the insolubles contained therein. In order to be acceptable, the product solutions should have a light transmission of about 85%.

The turbidity of the product solution of Examples 6 thru 9 is improved because of the decreased or lesser amount of $CO_2$ and the insolubles contained in the products. However, the products having a $CO_2$ content greater than 1.0%, are not acceptable since their solutions are excessively turbid. In Example 4, the amount of $CO_2$ in the feed was counteracted by the addition of an excess of sodium hydroxide. With a mole ratio of 1.10 of sodium to silicate, the turbidity of the product solution of Example 4 was improved over that of Examples 1 thru 3 but the insolubles in the products still exceeded the commercial limits. Examples 6 thru 9 were carried out with the purpose of eliminating $CO_2$ as much as possible from the feed and process system.

The $CO_2$ content was reduced to about 0.35% and in the feed, i.e., sodium metasilicate liquor, of Examples 6 thru 9 because the sodium metasilicate was prepared by digesting sand with NaOH, as described above and illustrated in Example 10, below. Also, the ratio of sodium to silicate was adjusted to about 1.04, as preferred according to the present invention. Accordingly, as shown in Examples 6 thru 9, the turbidity was greatly improved and the product particles were acceptable.

In Example 5, it was determined whether a higher $CO_2$ content in the feed could be made into an acceptable product when the fluidizing air was re-cycled in the fluid bed system. Such procedure did not provide favorable results as shown in Table I.

The anhydrous sodium metasilicate particles produced according to the present invention were tested for attrition resistance. The results of that test are recorded with the test results of commercial metasilicate particles below in Table II.

The attrition test is performed in a unit similar to a cyclone dust collector with a cloth dust filter and a bottom pan collecting section. The effect of passing the anhydrous particles through the unit is the same as a pneumatic conveying machine or a rough mixing machine. Such testing apparatus is directed more to the resistance of anhydrous particles to surface attrition and not to the actual hardness of particles.

The particles after having been run through the attrition test unit, are then transferred to standard screens for a 10-minute Tyler Ro-Tap test. In this test, screen mesh sizes are 20, 30, 40, 60, 80 and 100. Accordingly, the screen test on the attrited test sample is compared with the "before" attrition screen test of the original particle material.

The attrition test, followed by the screen test, has been performed on commercial particles of anhydrous sodium metasilicate produced according to the process described in U.S. Pat. No. 3,208,822, wherein particles are coated with a silicate liquor spray in a rotating cylinder to build up layers of anhydrous sodium metasilicate. A comparison of the results of the tests on these commercial particles with the results of the test on particles produced in Example 9, above, is provided in Table 2, below. The results are of the particles before and after the attrition test.

TABLE II

| SCREEN NUMBERS | COMMERCIAL PARTICLES(%) | | EXAMPLE 9 PARTICLES(%) | |
|---|---|---|---|---|
| | BEFORE | AFTER | BEFORE | AFTER |
| +20 | 0 | 0 | 0 | 0 |
| +30 | 50 | 33.0 | 50 | 44.4 |
| +40 | 50 | 58.2 | 50 | 51.3 |
| +60 | 0 | 5.7 | 0 | 2.6 |
| +80 | 0 | 0.8 | 0 | 0.1 |
| +100 | 0 | 0.2 | 0 | 0.1 |
| −100 | 0 | 2.1 | 0 | 1.5 |
| | 100.0 | 100.0 | 100.0 | 100.0 |

As a result of the attrition test, more than 33% of the commercial particles were attrited, as compared to only 15% of the particles of Example 9.

In addition to the attrition test, the commercial particles and particles of Example 9 were compared for their respective dust contents. The results of the comparison showed a dust content of 107 ppm in the commercial particles as compared to a dust content of only 43 ppm in the particles of Example 9.

These results together with the results provided in Table II, illustrate that the sodium metasilicate particles of the present invention have an attrition resistance superior to that of the commercial particles. Also, the particles of this invention are more uniformly spherical and not jagged edged as are the commercial particles.

What is claimed is:

1. A process for producing uniform spherical anhydrous sodium metasilicate particles of high attrition resistance and a minimum dust content, said process comprising:
   a. providing a plurality of anhydrous sodium metasilicate particles in a fluidization zone;
   b. contacting said particles in said fluidization zone with an upwardly flowing stream of heated air having a superficial velocity of between about 75 and about 200 feet per minute thereby providing a dilute upper phase of fine particulate anhydrous sodium metasilicate and a lower dense fluidized bed of said particles of anhydrous sodium metasilicate; and
   c. contacting said particles in said dense fluidized bed with an aqueous sodium metasilicate liquor to produce crystallized anhydrous sodium metasilicate said aqueous sodium metasilicate liquor being sprayed directly into said fluidization zone below the meniscus separating said dilute upper phase and said lower dense fluidized bed.

2. A process according to claim 1 wherein the particles in said fluidized bed are maintained at a temperature between about 125° and about 350°C.

3. The process of claim 2 wherein the aqueous sodium metasilicate liquor is sprayed in an upwardly direction into said lower dense fluidized bed.

4. The process of claim 2 wherein the aqueous sodium metasilicate liquor is sprayed horizontally into said dense fluidized bed.

5. A process according to claim 1 wherein said air prior to passing through said fluidization zone is heated to a temperature of about 250° to about 1,000°C.

6. A process according to claim 1 wherein said aqueous sodium metasilicate liquor contains between about 40 and 60% sodium metasilicate in water.

7. A process according to claim 1 wherein said aqueous sodium metasilicate liquor is prepared by digesting sand with NaOH at an elevated temperature between about 190° and about 240°C. and under a pressure between about 140 and about 325 psi prior to being injected into the fluidized bed.

8. A process according to claim 1 wherein the aqueous sodium metasilicate liquor contained less than 1.0% by weight of $CO_2$.

9. A process for producing uniform spherical anhydrous sodium metasilicate particles of high attrition resistance, said process comprising:
   a. providing a plurality of anhydrous sodium metasilicate particles in a fluidization zone;
   b. contacting said particles in said fluidization zone with an upwardly flowing stream of air having a superficial velocity of between about 75 and about 200 feet per minute which is heated prior to passing through the zone to a temperature of about 250° C. to 1,000° C. thereby providing a dilute upper phase of fine particulate anhydrous sodium metasilicate and a lower dense fluidized bed of said particles of anhydrous sodium metasilicate; and c. contacting said particles in said fluidized bed with an aqueous sodium metasilicate liquor to produce crystallized anhydrous sodium metasilicate said aqueous sodium metasilicate liquor being sprayed directly into said fluidization zone below the meniscus separating said dilute upper phase and said lower dense fluidized bed.

10. A process according to claim 9 wherein the particles in said fluidized bed are maintained at a temperature between about 125° and about 350°C.

11. A process according to claim 9 wherein said aqueous sodium metasilicate liquor is prepared by digesting sand with NaOH at an elevated temperature between about 190° and about 240°C., and under a pressure between about 140 and about 325 psi prior to being injected into the fluidized bed.

* * * * *